Figure 1:
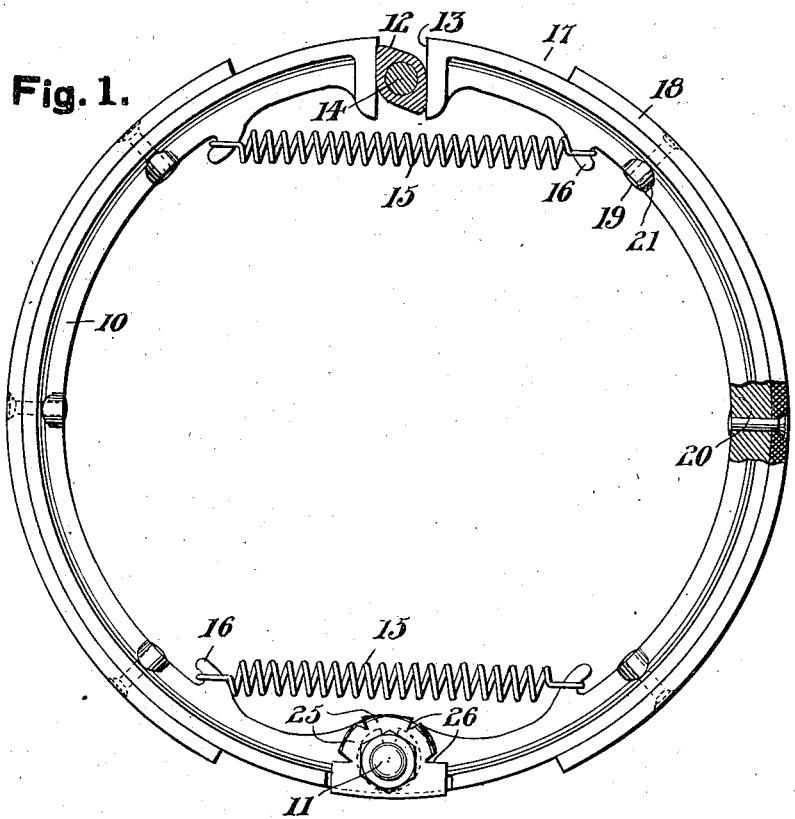

C. S. SHUMAKER.
AUTOMOBILE BRAKE SHOE.
APPLICATION FILED JUNE 30, 1914.

1,136,446.

Patented Apr. 20, 1915.

Witnesses
M. E. Lowry
T. W. Bryant

Inventor
Charles S. Shumaker
A. M. Wilson
Attorney

UNITED STATES PATENT OFFICE.

CHARLES S. SHUMAKER, OF JEANNETTE, PENNSYLVANIA.

AUTOMOBILE BRAKE-SHOE.

1,136,446.  Specification of Letters Patent.  Patented Apr. 20, 1915.

Application filed June 30, 1914. Serial No. 848,222.

*To all whom it may concern:*

Be it known that I, CHARLES S. SHUMAKER, a citizen of the United States of America, residing at Jeannette, in the county of Westmoreland and State of Pennsylvania, have invented certain new and useful Improvements in Automobile Brake-Shoes, of which the following is a specification.

This invention relates to new and useful improvements in automobile brake shoes.

The primary object of this invention is to provide an expansible band brake especially adapted for use upon automobiles and having a two-piece shoe construction which reduces the liability of injury or breaking of the brake parts.

A further object is the provision of such a two-piece brake shoe which is capable of being more easily operated and with less strain than the single piece shoe while at the same time imparting additional strength to the brake.

A still further object is the provision of an advantageous form of hinge connection between the two coöperating parts of a brake shoe and the said connection being so constructed as to readily allow the removal of one shoe part in the event of injury and the substitution of a new part therefor.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—

Figure 2:
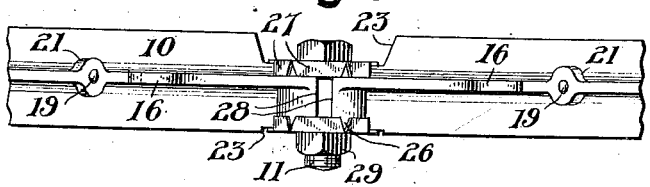
Figure 4:
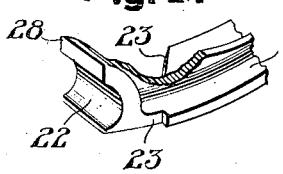
Figure 3:
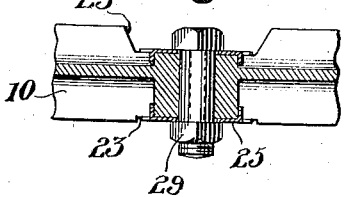
Figure 5:
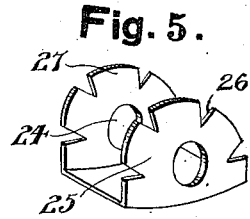

Figure 1 is a front elevation of the complete brake shoe, the operating cam being shown in section and the device detached from the vehicle. Fig. 2 is a plan view of the hinge connection between the brake shoe parts with the shoes broken away and the adjacent tensioning spring removed, the view being taken interiorly of the circular shoe. Fig. 3 is a sectional view taken through the pivotal connection of the brake shoe parts. Fig. 4 is a perspective view of an end portion of one of the brake shoe parts, the same being partially broken away, and Fig. 5 is a perspective view of the pivot bearing hinge clip detached.

Referring more in detail to the drawings, it is to be noted that the brake shoe is broadly of the form employed in vehicle brakes and in which the shoe surrounds the axle and is adapted to be expanded for an engagement of the outer curvature of the shoe with a cylindrical housing or casing within which the shoe is mounted and whereby the braking operation is effected by reason of such frictional contact between the shoe and housing.

It is now designed to provide an expansible circular brake shoe formed in two substantially semi-circular sections 10 hinged together by the hinge bolt 11 and provided with a cam 12 bearing between the end faces 13 of the sections and whereby a turning of the cam 12 by imparting a partial revolution to the cam shaft 14 the shoe sections 10 may be expanded against the tension of the springs 15 which are secured to opposite hooks 16 of the said sections and normally resiliently hold the sections against the cam 12 and with the frictional faces of the sections out of contact with the brake drum or housing and thus in the inoperative position of the brake.

The outer convex faces 17 of the shoe sections are provided with a friction packing or band 18 formed of any desired material such as fiber or asbestos while such packing strips 18 are secured to the shoe sections by means of pins or rivets 19 passing through the packings and also through the perforations 20 of the sections and the bosses 21.

The ends of the sections 10 opposite to the cam engaging ends 13 are provided with semi-cylindrical bearings 22 and the pivot bolt 11 is positioned within the bearing so formed and thus provides a hinging together of the said ends of the sections and with the bolt 11 constituting the removable pintle of the hinge. A clip of the form illustrated in Fig. 5 fits beneath the ends of the sections and is received within opposite cut away portions 23 of the section ends. The clip is provided with opposite alining perforations 24 through which the bolt 11 extends, while the sides 25 of the clip are provided with serrations 26 which divide the sides into a plurality of bendable ears 27. The hinging ends of the sections are provided with curved hub portions 28 and through which the aforementioned bearings 22 extend and the ears 27 are adapted to be bent inwardly for inclosing the opposite ends of the two part hub 28. It will thus be seen that the reduced ends of the shoe sections are hinged together by means of the clip 25 which incloses the ends of the hub 28, while the complete hinge is formed by providing therewith, the pintle bolt 11 which is secured in position by means of the lock nut 29. It will thus be evident that a two part brake shoe is provided which has its equal sections hinged together at one point in the circular shoe while a cam separating means is positioned between the other ends of the sections at a diametrically opposite point upon the shoe. The springs 15 normally hold the shoe sections inoperative while a turning of the cam expands the shoe for operative frictional engagement of its surface packing 18 with the casing of the brake.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim as new is:—

1. In combination with two semi-circular brake shoe sections, each of which sections has a semi-tubular hub at one end thereof, a clip having side members inwardly bent inclosing the adjacent hub end, the said clip having openings in the sides thereof alining with the bearing of said hub and a pintle bolt secured through said openings and bearing.

2. A brake shoe comprising two semi-circular sections, each having a semi-tubular hub at one end thereof, said sections having opposite cut away portions at their adjacent ends and adjacent to said hubs, a clip partially surrounding said hub and having its sides positioned in said cut away portions and provided with ears bent inwardly engaging around said hub, the sides of said clip provided with alined perforations and a pintle bolt through said perforations and said hub.

3. A brake shoe comprising two semi-circular sections, semi-tubular hubs upon the adjacent ends of said sections, and said section ends being cut away upon opposite sides thereof adjacent said hub, a U-shaped clip partially surrounding said hub and provided with inwardly bent portions engaging the outer faces of said hub, the sides of said clip provided with alining openings, and a pintle bolt secured through said openings and through the said hubs.

In testimony whereof I affix my signature in presence of two witnesses.

CHARLES S. SHUMAKER.

Witnesses:
CLARK SMITH,
H. V. ROWAN.